Patented Jan. 19, 1943

2,308,544

UNITED STATES PATENT OFFICE 2,308,544

TERPENE-MODIFIED PHENOLIC RESIN AND PROCESS FOR PREPARING SAME

Israel Rosenblum, New York, N. Y.

No Drawing. Application October 24, 1939, Serial No. 300,921

13 Claims. (Cl. 260—53)

The present invention relates to an improved process for the incorporation of non-resinous terpenic substance in phenol-aldehyde condensates, and to the soluble resinous products obtained thereby.

This application is a continuation-in-part of my copending application, Ser. No. 225,722, filed August 19, 1938, which in turn is a consolidation of my earlier applications, Ser. No. 538,248, filed May 18, 1931; Ser. No. 580,495, filed December 11, 1931; Ser. No. 594,379, filed Feb. 20, 1932; and Ser. No. 628,298, filed August 11, 1932.

A number of different procedures have been already suggested for producing phenol-aldehyde condensates having chemically incorporated therein considerable proportions of non-resinous terpenic substances, and particularly liquid or low melting point solid substances of this type of a boiling point higher than that of turpentine, such as dipentene, terpineol and various commercial terpenic mixtures, such as pine oil. Thus methods are known wherein dipentene is first combined with phenol, and thereafter the terpene-substituted phenol is combined with formaldehyde. In each of these processes, however, rather strong catalysts are employed, and the resulting resins are not highly alkali-proof. In fact, in certain known processes involving an initial reaction between a phenol and a terpene (see, for instance, Example 3 of German Patent No. 340,989, which refers to Koenig's method, Berichte 23 (1890) p. 3146), enormous quantities of sulphuric and acetic acids are employed, so much so as to make the process commercially prohibitive. Moreover, where sulphuric acid is employed as a catalyst, it sometimes happens that certain modifications in the resin, perhaps caused by the presence of sulphur compounds, unfavorably influence the properties of varnishes made with the resin.

I have found that in the case of certain phenol-formaldehyde condensates, a quite efficient reaction with non-resinous, liquid terpenic materials (that is, liquid at ordinary temperature) can be obtained with the aid of small amounts of inexpensive catalysts which do not unfavorably affect the final product, and even without the aid of any additional catalysts. The type of phenol-aldehyde condensate in question is one obtained by condensing a homologue of phenol, and particularly a higher phenol, such as butyl, amyl and octyl phenols, with formaldehyde in the presence of an amount of a strongly basic catalyst, preferably sodium hydroxide, sufficient to keep the condensate in aqueous solution, the reaction being conducted under such limited conditions of time and temperature that the condensate does not precipitate out of the alkaline solution. The condensation is, however, conducted for such a length of time that after acidification, the resin precipitates out. The proportions of phenol and formaldehyde are such that the resin is potentially reactive and on further heating alone would decompose. The heating in the alkaline state is conducted for such a length of time that on acidification a light oily syrup is obtained; the production of a heavy, difficultly manipulable viscous mass is preferably avoided. This syrupy resin is now heated with a relatively large amount of a terpenic material, such as dipentene with or without the addition of a relatively mild catalyst, such as an organic salt of zinc or of calcium or the like. The materials are heated together until a uniform, solid, and fusible resin is obtained, the reaction being preferably conducted, at least in its last stage, at temperatures sufficient to expel volatile material so that a product which is solid at room temperature is obtained.

According to the invention, a substituted phenol, such as butyl, amyl or octyl phenol, or a mixture of such phenols, with or without a minor proportion of ordinary phenol or cresol or xylenols, is reacted with at least an equivalent proportion, and preferably considerably more than an equi-molecular proportion of formaldehyde, for example, 2 to 2.2 mols of the latter to each mol of phenol, in the presence of a sufficient amount of aqueous solution of sodium or other alkali metal hydroxide (about 0.4 to 0.5 mol to each mol of phenol) to maintain the condensate in solution. The reaction is conducted at a temperature of about 60°-80° C. and for a length of time sufficient to yield, on acidification, a resin in a rather advanced stage of condensation, that is, in an oily or syrupy condition. This will require about 3 to 4 hours. The reaction product is then acidified, as with sulphuric or hydrochloric acid, with or without small amounts of acetic acid, thereafter preferably washed, and then heated to higher temperatures with dipentene or other liquid terpenic material. A solvent may be added to the mixture, and the latter may be further reacted either without the addition of catalytic material or with the addition of zinc acetate or other relatively mild catalyst, such as the acetate, abietate, and other resin and fatty acid soaps, or other organic compounds, or the oxide or hydroxide, of a metal of the second group of the periodic system, or a similar compound of a metal whose salts or soaps are commonly employed as driers (for example, lead, cobalt and manganese compounds).

The acid employed for the acidification may be any suitable inorganic or organic acid. The washing after the precipitation should be reasonably complete, but it is ordinarily not economical to continue the washing to complete removal of the sodium or other metal salt and of the precipitating acid, especially as there often arises the danger of formation of emulsions. The presence of small residues of the salt is, in fact, not objectionable as it doubtless acts catalytically. Excellent results both as to yield and properties of the obtained resin are secured with the use of a zinc compound as catalyst during the reaction with the terpenic material in the later stage of the process.

The avoidance of the use of of a strong inorganic acid as catalyst, such as sulphuric acid, results in a number of important advantages. Thus the product is frequently more desirable from the standpoint of color, color retention and durability, and particularly with respect to the drying properties of the varnishes and enamels prepared with these resins. Also, there is less tendency, under mild reaction conditions, toward the formation of a polymer of dipentene, which is a high boiling liquid and is very difficult to expel. Furthermore, cheaper vessels can be employed for the reaction, since acid-proof materials do not have to be resorted to. What is perhaps most important, there is avoided the frequent tendency of resins made with the aid of sulphuric acid as catalyst, of causing a continuously slower rate of drying of varnishes and particularly of enamels made with the resins, especially after storage of the enamels for some weeks. This is perhaps due to the entry of sulphur into the resin molecule, or is possibly the result of a reaction of sulphur in the resin with the driers, i. e., poisoning of the latter, in consequence of which the catalytic effect of the lead, cobalt or other driers on the drying of the coatings is reduced or even destroyed.

The reactive condensate obtained upon precipitation with acid is obtained as an oily syrup containing about 75% of recoverable resin. Upon mixing with dipentene, with or without additional catalyst, the condensate is first heated slowly, to effect dehydration, and further reaction, and then to higher temperatures, usually about 250–260° C. until practically all volatile matter has been driven off.

Preferably, a part of the terpenic material is present during the initial condensation of the phenol and aldehyde, the balance being added after the acidification and precipitation of the condensate. This quantity of dipentene may constitute, for example, about 10 to 50% of the total amount of dipentene to be engaged in the reaction.

The invention will be described in greater detail with the aid of the following examples which are presented for purpose of illustration only.

*Example 1*

1200 grams of butyl phenol and 1200 grams of 40% formaldehyde are condensed in the presence of an aqueous solution containing about 128 grams of NaOH in the presence of 150 grams of dipentene. The condensation is conducted at about 80° C. for about 3 to 4 hours. The resin solution is then acidified with, for example, acetic acid and upon being allowed to stand, a syrupy condensate separates out from the water. This syrup contains about 10% of dipentene and, after washing with water, is combined with a further quantity of dipentene as follows:

| | Grams |
|---|---|
| Butyl phenol condensate syrup (corresponding to about 1000 grams of final solid resin content) | 1315 |
| Dipentene | 550 |
| High flash naphtha | 550 |
| Zinc acetate | 10 | are heated, over a period of from 18 to 24 hours, first to about 130° C. to expel water, and the temperature then is slowly raised to about 250–260° C. and maintained at such value until substantially all volatile matter has been driven off. There is obtained a clear, hard resin which is soluble in varnish oils. The yield is about 1510 grams, showing that a large amount of the dipentene has been chemically incorporated in the product. Wood oil varnishes made with this resin are characterized by rapid drying, pale color, and high gloss, and the dried film is highly alkali-resistant.

*Example 2*

If in the process described in Example 1, 10 grams of calcium acetate are substituted for the zinc acetate, a similar resin is obtained except that the yield, under otherwise as identical conditions as possible, is 1460 grams.

*Example 3*

When the process described in Example 1 is carried out without the addition of zinc acetate, 1420 grams of resin are obtained, showing that although in this particular case the yield was smaller, a large proportion of dipentene has nevertheless been incorporated in the resinous product. A wood oil varnish made with this resin is rapid drying, pale in color, alkali-resistant, and makes a suitable vehicle for enamels containing titanium dioxide as the pigment, enamels containing driers retaining fully their quick-drying properties even after storage for long periods of time. Like the resins of Examples 1 and 2, the product of Example 3 can be used in admixture with other resins, such as ester gum, etc.

*Example 4*

672 grams of para-tertiary amyl phenol and 600 grams of 40% formaldehyde are reacted at about 60° C. for 4 hours in the presence of an aqueous solution of 65 grams of NaOH. A uniform solution is obtained which is then acidified with dilute sulphuric acid. A syrupy layer separates out and is washed two or three times with hot water, preferably with agitation, to remove salt and acid. The product is a highly reactive resin.

The resin syrup, which contains water, is then mixed with half its weight of dipentene and with a similar amount of a solvent, such as high flash naphtha or mineral spirits, and further treated as described under Example 1. A similar resin is obtained in which an amount of the terpene equal to about half the weight of the butyl phenol-formaldehyde condensate is chemically combined in the resin.

As already mentioned, other phenols may be employed, such as diisobutyl, octyl and other substituted phenols; and likewise the diphenylol methanes obtained by condensing ordinary phenol or its homologues with acetone, methyl ethyl ketones and other ketone.

Although the examples describe the use of dipentene, which is the preferred terpene, it will be understood that it may be replaced in whole or in part by terpineol or other oxygenated terpene.

The resins produced as described hereinabove are soluble in the common resin solvents including acetone, turpentine, pine oil and its individual components, mineral spirits (petroleum distillates), etc.; and they are particularly suitable for the manufacture of oil varnishes as they are soluble in the drying and non-drying oils, including linseed, China-wood, perilla, sunflower seed, rubberseed, soya bean, cottonseed, fish and other vegetable and animal oils and mixtures thereof. The resins are preferably condensed to the point at which they are solid at room temperature, but the reaction may be stopped when the resins are plastic at ordinary temperatures, especially when the proportion of ordinary phenol and formaldehyde is high. The resins are suitable for the manufacture of varnishes, lacquers, paints, etc.

The resins prepared as above described may be combined with rosin or other natural resins, ester gum, and other synthetic resins.

It will be noted that the amount of liquid terpene material employed in the above examples is of the order of the weight of the phenol. I have found that with the specific type of phenol-formaldehyde condensate described above, namely, one initially produced in the presence of a sufficient amount of strong alkaline material to keep the condensate in solution followed by precipitation with acid, a large proportion of liquid terpene material can be chemically incorporated without the aid of any strongly acid catalysts and yet yield a solid product, such proportion being from about ½ mol to about 1 mol, and even more, of the terpene to each mol of phenol, the actual amounts of terpene material employed being somewhat larger to allow for evaporation losses.

I claim:

1. The method of producing fusible, soluble phenol-formaldehyde condensates, which comprises reacting a phenol which is nuclearly substituted by a hydrocarbon residue of at least 2 carbon atoms with an at least equimolecular proportion of formaldehyde with the aid of a sufficient amount of a strong alkaline catalyst to keep the condensate in solution, continuing the condensation until, on acidification, there is obtained a syrupy resin, acidifying the alkaline condensation product, adding thereto a non-resinous terpene material of the group consisting of dipentene, terpineol and pine oil in such quantity that the molecular proportion of the latter to the phenol is at least about ½ to 1, continuing the condensation in the absence of strong acid, and finally heating the product to temperatures sufficient to cause expulsion of unreacted volatile matter.

2. A method according to claim 1, in which the terpene material is dipentene.

3. A method according to claim 1, wherein the terpene material is terpineol.

4. A method according to claim 1, wherein the terpene material is pine oil.

5. A method according to claim 1, wherein the molecular proportion of terpene material to phenol is approximately 1:1.

6. A method according to claim 1, wherein, after the acidification, the syrupy resin is washed and further condensation with the added terpene material is conducted in the presence of a zinc salt.

7. A method according to claim 1, wherein, after the acidification, the syrupy resin is washed and further condensation with the added terpene material is conducted in the presence of a relatively neutral compound of a metal of the group consisting of zinc, calcium, lead, cobalt and manganese.

8. A method according to claim 1, wherein a part of the terpene material is present during the initial condensation of the phenol and aldehyde.

9. A process according to claim 1, wherein the phenol is butyl phenol.

10. A process according to claim 1, wherein the phenol is a condensation product of a phenol with a ketone.

11. The product of the process defined in claim 1.

12. The product of the process defined in claim 1 wherein the terpene material is dipentene.

13. A wood oil varnish containing the product obtained by the process defined in claim 1.

ISRAEL ROSENBLUM.